(12) United States Patent
Beckner et al.

(10) Patent No.: US 11,962,391 B2
(45) Date of Patent: Apr. 16, 2024

(54) INTERCEPTING SATELLITE TELEPHONE SIGNALS VIA A CUBE SATELLITE

(71) Applicant: Horizon Technologies Consultants, Ltd., Reading (GB)

(72) Inventors: John Beckner, Munich (DE); Gary Goodrum, Colo de Caza, CA (US)

(73) Assignee: Horizon Technologies Consultants, Ltd., Reading (GB)

( * ) Notice: Subject to any disclaimer, the term of this patent is extended or adjusted under 35 U.S.C. 154(b) by 0 days.

(21) Appl. No.: 17/878,250

(22) Filed: Aug. 1, 2022

(65) Prior Publication Data

US 2023/0077063 A1 Mar. 9, 2023

Related U.S. Application Data

(63) Continuation of application No. 16/939,379, filed on Jul. 27, 2020, now Pat. No. 11,438,056, which is a continuation of application No. 15/693,287, filed on Aug. 31, 2017, now Pat. No. 10,727,932.

(60) Provisional application No. 62/381,909, filed on Aug. 31, 2016.

(51) Int. Cl.
*H04B 7/185* (2006.01)
*H04L 1/00* (2006.01)
*H04W 80/06* (2009.01)
*H04W 84/06* (2009.01)

(52) U.S. Cl.
CPC ..... *H04B 7/18504* (2013.01); *H04B 7/18565* (2013.01); *H04L 1/0045* (2013.01); *H04W 80/06* (2013.01); *H04W 84/06* (2013.01)

(58) Field of Classification Search
None
See application file for complete search history.

(56) References Cited

U.S. PATENT DOCUMENTS

| 5,742,639 | A | 4/1998 | Fasulo, II et al. |
| 5,943,324 | A | 8/1999 | Ramesh et al. |
| 6,636,721 | B2 | 10/2003 | Threadgill |
| 6,823,170 | B1* | 11/2004 | Dent ............... H04B 7/18515 455/430 |
| 6,823,185 | B1 | 11/2004 | Comer et al. |
| 6,933,888 | B1 | 8/2005 | Schiffmiller |
| 8,705,436 | B2* | 4/2014 | Dutta ............... H04H 20/74 455/12.1 |

(Continued)

FOREIGN PATENT DOCUMENTS

FR 2922700 4/2009

OTHER PUBLICATIONS

Wypych, Tom et al., "System for Interactive Management of Aerial Imaging Campaigns," Aerospace Conference, 2013 IEEE, Mar. 2, 2013, 7 pages.

*Primary Examiner* — Phirin Sam
(74) *Attorney, Agent, or Firm* — Jones Day

(57) ABSTRACT

The terrestrial-based satellite telephone monitoring system may be used for, among other things, intelligence gathering purposes that intercept communications to or from target satellite handsets or terminals. The exemplary signal processing units receive wireless signals and extend the line-of-sight range of a terrestrial-based satellite telephone monitoring system. The exemplary signal processing unit may be installed in or on an aerial vehicle, such as an unmanned aerial vehicle (UAV), or a satellite, such as a CubeSat, or other vehicle.

20 Claims, 6 Drawing Sheets

(56) References Cited

U.S. PATENT DOCUMENTS

| | | |
|---|---|---|
| 2002/0093963 A1 | 7/2002 | Roullet et al. |
| 2004/0038644 A1 | 2/2004 | Jimenez et al. |
| 2004/0259497 A1* | 12/2004 | Dent ................. H04B 7/18515 |
| | | 455/12.1 |
| 2008/0021730 A1 | 1/2008 | Holla |
| 2010/0285769 A1 | 11/2010 | Conroy |
| 2011/0034166 A1 | 2/2011 | Karabinis |
| 2012/0178362 A1 | 7/2012 | Fleeter |
| 2012/0293371 A1 | 11/2012 | Lu |
| 2013/0125176 A1 | 5/2013 | Khan |
| 2013/0203437 A1 | 8/2013 | Whelan |
| 2013/0332072 A1 | 12/2013 | Janky |
| 2014/0192708 A1 | 7/2014 | Wise |
| 2015/0005005 A1 | 1/2015 | Neukirch et al. |
| 2015/0054639 A1 | 2/2015 | Rosen |
| 2016/0036519 A1* | 2/2016 | Loomis ................... G01S 19/41 |
| | | 370/316 |
| 2016/0073207 A1 | 3/2016 | Khenkin |
| 2016/0245923 A1 | 8/2016 | Badke |
| 2016/0254854 A1 | 9/2016 | Wharton |
| 2016/0381657 A1* | 12/2016 | Blanchard ........... H04W 64/006 |
| | | 455/427 |
| 2017/0006620 A1 | 1/2017 | Reis |
| 2018/0062674 A1 | 3/2018 | Boghrat |
| 2018/0284735 A1 | 10/2018 | Cella |
| 2019/0339416 A1 | 11/2019 | Elkabetz |
| 2020/0382961 A1* | 12/2020 | Shattil ..................... H04L 43/18 |
| 2021/0166322 A1* | 6/2021 | Allen ..................... G06Q 40/08 |
| 2022/0029697 A1* | 1/2022 | Bakr ................... H04B 7/0695 |

\* cited by examiner

INTERCEPTING SATELLITE TELEPHONE SIGNALS VIA A CUBE SATELLITE

CROSS-REFERENCE TO RELATED APPLICATIONS

This application is a continuation of U.S. patent application Ser. No. 16/939,379, filed Jul. 27, 2020, which is further a continuation application of U.S. patent application Ser. No. 15/693,287, filed Aug. 31, 2017, now U.S. Pat. No. 10,727,932, which claims priority to and benefit from U.S. Provisional Patent Application No. 62/381,909, entitled "Satellite Telephone Monitoring Via Unmanned Aerial Vehicles," filed Aug. 31, 2016. All of the foregoing related applications, in their entirety, are hereby incorporated by reference.

TECHNICAL FIELD

This patent document relates to devices, systems, and methods for satellite telephone monitoring.

BACKGROUND

A communications satellite relays telecommunications signals to establish a communication channel between a transmitter and a receiver at different locations on Earth. Communications satellites are used for several applications, such as television, telephone, radio, internet, and military applications. Communications generally requires line-of-sight between a transmitter and receiver. As such, ground-to-ground communications can be obstructed by the curvature of the Earth. Ground-to-satellite-to-ground communications extend the line-of-sight range around the curvature of the Earth thereby allowing communications between more widely separated points.

SUMMARY

In an exemplary embodiment, signal processing units are disclosed that receive wireless signals and extend the line-of-sight range of a terrestrial-based satellite telephone monitoring system. The terrestrial-based satellite telephone monitoring system may be used for, among other things, intelligence gathering purposes to intercept communications to or from a satellite handset or terminal. The exemplary signal processing unit may be installed in or on an aerial vehicle, such as an unmanned aerial vehicle (UAV), or a satellite such as a CubeSat, a manned aircraft, or other vehicle.

Methods, apparatuses, systems, and non-transitory computer readable media are disclosed. In an exemplary embodiment, a method of processing radio frequency (RF) signals is disclosed. The exemplary method comprises sampling the RF signals by monitoring a satellite frequency band. From the sampled RF signals, RF information may be determined including frequency and timing information from a satellite spot beam. An uplink and a downlink may be sampled according to the RF information to reduce a bandwidth of the uplink and the downlink. The downsampled uplink and the downsampled downlink may be combined into a call data stream. The call data stream may be compressed by removing downsampled data corresponding to inactive frequencies and inactive timeslots of the downsampled downlink and downsampled uplink based on the determined frequency and timing information. A call data packet stream may be generated based on the compressed call data stream. The generated call data packet stream may be transmitted.

In an exemplary embodiment, a signal processing apparatus is disclosed. The signal processing apparatus may include an analog to digital converter to sample RF signals. The apparatus may further include a memory configured to store instructions, and a processor configured to read instructions from the memory and to implement a method for processing an uplink RF data and a downlink RF data. The instructions may include code for determining, from the sampled RF signals, RF information including frequency and timing information from a satellite spot beam. The instructions may further include code for downsampling, an uplink and a downlink according to the RF information, to reduce a bandwidth of the uplink and the downlink, and combining the downsampled uplink and the downsampled downlink into a call data stream. The code may further include code for compressing the call data stream by removing downsampled data corresponding to inactive frequencies and inactive timeslots of the downsampled downlink and downsampled uplink based on the determined frequency and timing information. The code may include code for generating call data packet streams based on the compressed call data, and/or a transmitter to transmit the generated call data packet streams.

In an exemplary embodiment, a method of processing call data includes receiving call data packet streams; converting the received call data into RF waveforms; upconverting the RF waveforms to sample frequencies; downconverting, demodulating, and detecting the sample frequencies to produce digital call data; decrypting the digital call data; and/or removing an error correction code from the decrypted digital call data.

In some exemplary embodiments, signal processing apparatuses for the exemplary method of processing RF signals and call data are also disclosed.

In an exemplary embodiment, a system for receiving and processing radio frequency (RF) signals is disclosed. The system comprises a satellite, an aerial vehicle, and a monitoring system. The satellite is configured to receive in a first frequency band uplink RF data from a mobile device, the satellite further configured to transmit in the first frequency band downlink RF data to the mobile device. The aerial vehicle comprises a first antenna configured to receive in the first frequency band the uplink RF data from the mobile device, a second antenna configured to receive in the first frequency band the downlink RF data transmitted from the satellite, and a first signal processing unit. The first signal processing unit comprises an analog to digital converter configured to sample RF signals by monitoring a satellite frequency band; a first memory configured to store instructions, and a first processor configured to read instructions from the first memory and to implement a method for processing the uplink and the downlink RF data, the instructions comprising: code for determining, from the sampled RF signals, RF information including frequency and timing information from a satellite spot beam; code for downsampling an uplink and a downlink according to the RF information, to reduce a bandwidth of the uplink and the downlink, and combining the downsampled uplink and the downsampled downlink into a call data stream; code for compressing the call data stream by removing downsampled data corresponding to inactive frequencies and inactive timeslots of the downsampled downlink and downsampled uplink based on the determined frequency and timing information; and/or code for generating a call data packet stream based on the compressed call data stream. The monitoring system may also include a second signal processing unit that includes: a fourth antenna configured to receive call data from the aerial vehicle in the second frequency band; a receiver to receive call data packet streams; a second memory configured to store instructions, and a second processor configured to read instructions from the second memory and to implement a method for processing call data, the instructions comprising: code for converting the received call data into RF waveforms; code for upconverting the RF waveforms to sample frequencies; code for downconverting, demodulating, and detecting the sample frequencies to produce digital call data; code for decrypting the digital call data; and/or code for removing an error correction code from the decrypted digital call data.

In another exemplary embodiment, a system for receiving and processing radio frequency (RF) signals is disclosed. The system comprises a first satellite, an aerial vehicle, a second satellite, and a monitoring system. The first satellite configured to receive in a first frequency band an uplink RF data from a mobile device, the first satellite further configured to transmit in the first frequency band a downlink RF data to the mobile device. The aerial vehicle comprises a first antenna configured to receive in the first frequency band the same uplink RF data from the mobile device, a second antenna configured to receive in the first frequency band the downlink RF data transmitted from the first satellite, and a first signal processing unit, comprising: an analog to digital converter configured to sample RF signals by monitoring a satellite frequency band; a first memory configured to store instructions, and a first processor configured to read instructions from the first memory and to implement a method for processing RF signals, the instructions comprising: code for determining, from the sampled RF signals, RF information including frequency and timing information from a satellite spot beam; code for downsampling an uplink and a downlink according to the RF information, to reduce a bandwidth of the uplink and the downlink, and combining the downsampled uplink and the downsampled downlink into a call data stream; code for compressing the call data stream by removing downsampled data corresponding to inactive frequencies and inactive timeslots of the downsampled downlink and downsampled uplink based on the determined frequency and timing information; and/or code for generating a call data packet stream based on the compressed call data stream; and a third antenna configured to transmit in a second frequency band the call data packet streams. The second satellite is configured to receive in the second frequency band the call data packet streams transmitted from the aerial vehicle, the second satellite further configured to transmit the call data packet streams in the second frequency band. The monitoring system comprises a second signal processing unit that includes: a fourth antenna configured to receive in the second frequency band call data from the second satellite; a receiver to receive call data packet streams; a second memory configured to store instructions, and a second processor configured to read instructions from the second memory and to implement a method for processing call data, the instructions comprising: code for converting the received call data into RF waveforms; code for upconverting the RF waveforms to sample frequencies; code for downconverting, demodulating, and detecting the sample frequencies to produce digital call data; code for decrypting the digital call data; and/or code for removing an error correction code from the decrypted digital call data.

BRIEF DESCRIPTION OF THE DRAWINGS

Like reference numeral refer to similar features.

DETAILED DESCRIPTION

Airborne satellite telephone monitoring systems may be installed on a variety of unmanned or manned aircraft. These airborne satellite telephone monitoring systems may require line-of-sight (LOS) to one or more handsets (such as a hand-held satellite terminal). To provide satellite communications, the handset may be within one or more satellite spot beams, each of which may be several hundred miles in diameter. Ground and/or ship-based systems may have a restricted line-of-sight to the handset, which may limit the reception of handset signals that are not within direct line of sight of the ground and/or ship. But complete satellite telephone monitoring systems may be too large and/or too heavy to be installed directly on all but the largest class of UAVs. The present disclosure enables UAVs, manned aircraft, or low-earth orbit satellites to be used to extend the range of satellite monitoring systems to beyond LOS. For example, satellite call monitoring may be performed on submarines, ships, manned aircraft, aerostats, and/or land based ground stations.

Figure 1:
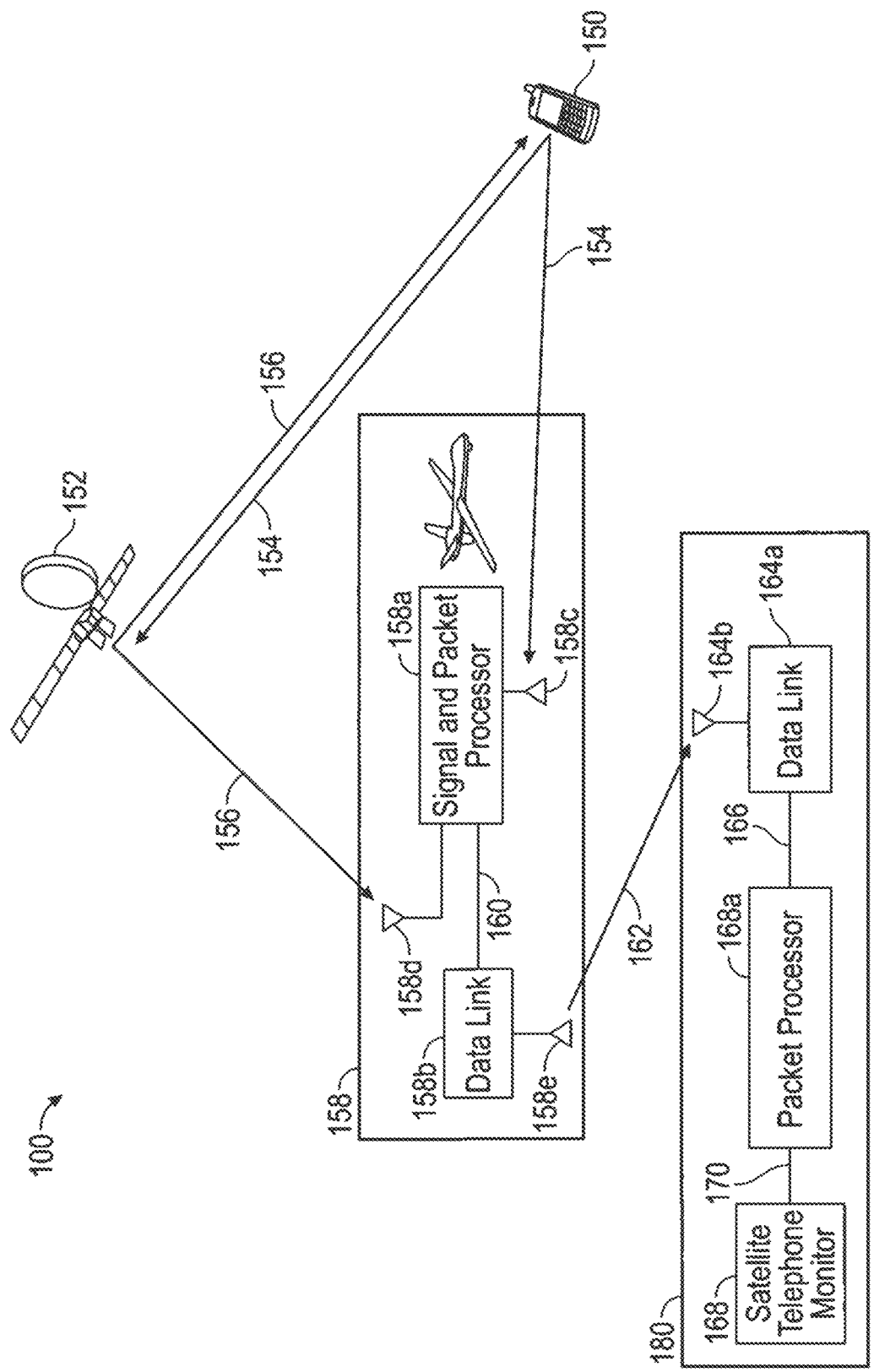
FIG. 1 depicts an unmanned aerial vehicle (UAV) based satellite telephone monitoring system, in accordance with some example embodiments.

FIG. 1 depicts a satellite telephone monitoring system (STMS) 100 in accordance with some example embodiments. The STMS may monitor a satellite handset 150 in communication with a satellite 152. Satellite 152 may provide communication from handset 150 to a ground station that may communicate through a public switched telephone network to a connected telephone that is a land line telephone, or through a cellular system to a connected telephone that is a cellular telephone. Handset 150 may transmit uplink 154 to satellite 152 and receive downlink 156 from satellite 152. Uplink 154 and downlink 156 may operate at an L-band frequency or any other frequency. Uplink 154 may include a representation of a user's voice at handset 150 and downlink 156 may include a representation of voice from the connected telephone. For example, the representation of the user's voice may include a voice that has been digitized and the resulting data is carried by the uplink. Similarly, the representation of the voice at the connected telephone may include another voice that has been digitized and the resulting data is carried by the downlink. Satellite 152 may operate as part of an existing satellite system such as Thuraya, Isatphone, Globalstar, Iridium, or any other satellite communications system. Handset 150 may operate using a satellite system such as Thuraya, Isatphone, Globalstar, Iridium, or any other satellite communications system, or any combination of systems. Handset 150 may be capable of operating in more than one satellite system. Handset 150 may be a hand-held device, a satellite communications device that is smaller than a handheld device, or a satellite communications device that is larger than a hand-held device. Handset 150 may be a mounted device such as a satellite communications device mounted to a vehicle such as a car, truck, or other vehicle.

In addition to the satellite 152, an airborne platform such as unmanned aerial vehicle (UAV) 158 may be in a location suitable to receive uplink 154 from handset 150. UAV 158 may also be in a location that is within one or more spot beams of satellite 152 and accordingly UAV 158 may be able to receive downlink 156 from satellite 152. UAV 158 may include antenna 158c to receive the uplink signal from handset 150 and may include antenna 158d to receive downlink signal 156 from satellite 152. In some example embodiments, UAV 158 may be replaced by a small satellite such as a CubeSat or nano-satellite, or a large UAV such as a Globalhawk, Predator or other large UAV, or 158 may be a manned aircraft.

UAV 158 may include signal and packet processor 158a. In some example embodiments, signal and packet processor 158a may process a wideband digital signal sampled at a high sampling rate to produce a lower bandwidth and lower sample rate digital signal containing payload (voice or data) and control data from uplink 154 and downlink 156. By reducing the bandwidth and sampling rate, the signal and packet processor 158a enables transmission of the payload (voice or data) and control data associated with the uplink 154 and downlink 156 via a low data rate data link on the UAV. For example, signal and packet processor 158a may reduce the data rate needed to send the handset uplink 154 and/or downlink 156 from approximately 750 Megabits per second (Mbps) to approximately 1 Mbps. A digital signal representative of voice and control data for the uplink 154 and the downlink 156 may be combined together into a single data stream that may be sent by data link 158b to data link 164a at ground station 180. The combined uplink/downlink data stream may be compressed using data compression to reduce the data rate needed to send the combined data. The combined data may further include forward error correction encoding (FEC). Data links 158b and 164a may operate at an L-band, an S-band, or at any other frequency.

In some example embodiments, UAV 158 may intercept the uplink and downlink associated with handset 150 and store the data for transmission at a later time. For example, UAV 158 may fly into an area where a handset 150 call may be intercepted. The location may be out of range from data link 164a at the ground station. Accordingly, signal and packet processor 158a may store the intercepted data and forward the data to the ground station 180 when UAV is within range of data link 164a.

Signal and packet processor 158a may produce a digital data stream sent via cable 160 to data link 158b. In some example embodiments, the digital data stream may be a synchronous or an asynchronous serial data stream passed to data link 158b. In other embodiments, the data stream may be a packetized data stream such as UDP (User Datagram Protocol), Transmission Control Protocol (TCP), and/or TCP/IP (Transmission Control Protocol/Internet Protocol). Data link 158b included in UAV 158 may communicate via antenna 158e to ground station 180.

Ground station 180 may include data link 164a that communicates via antenna 164b to antenna 158e and data link 158b. Data links 158b and 164b may use half-duplex unidirectional communication from UAV 158 to the ground station 180, or full duplex bidirectional communication from UAV 158 to ground station 180 and from ground station 180 to UAV 158. Data links 158b and 164a may operate using frequency division multiple, access (FDMA), time-division multiple access (TDMA), code division multiple access (CDMA), space division multiple access (SDMA) or any other type of multiple access method or any combination of multiple access methods.

Ground station 180 may also include packet processor 168a and satellite telephone monitor 168. Data link 164a may receive the data from UAV 158 which may include payload and/or control data from uplink 154 and downlink 156 combined into a single data stream. Packet processor 168a may decode forward error correction and/or decode data compression in the single data stream to produce one or more decoded and uncompressed data streams. In some example embodiments, the decoded and uncompressed data may be separated according to which satellite system the uplink and downlink correspond. For example, packet processor 168a may have a signal processing path for Thuraya signals and a separate signal processing path for IsatPhone signals. Other signal processing paths may also be included in addition to, or instead of, Thuraya and IsatPhone. In some example embodiments, packet processor 168a may generate (or re-generate) from each satellite system specific uplink and downlink data the same radio frequency signals that were intercepted by UAV 158 between handset 150 and satellite 152. For example, packet processor 168a may generate a 1.5 GHz signal corresponding to the intercepted downlink 156 and 1.6 GHz signal corresponding to the intercepted uplink signal. The generated signals may be voltage waveforms, current waveforms, power waveforms, or any other type of waveform. The generated RF signals may include an uplink signal and a downlink signal for one or more satellite systems such as Thuraya. The RF uplink signal and RF downlink signal may then be provided to satellite telephone monitor 168. In some other example embodiments, the uplink and downlink signals may be provided to the satellite telephone monitoring system at one or more different frequencies than the intercepted signals. For example, the uplink and downlink may be provided to the satellite monitoring system at one frequency such as 70 MHz or the uplink and downlink may be provided at different frequencies.

Satellite telephone monitor 168 may include one or more downconverters to downconvert back to baseband the signal from packet processor 168a. Satellite telephone monitor 168 may also include receivers to for signals from Thuraya, IsatPhone, or other satellite systems. The receivers may include analog to digital converters, analog and/or digital filtering, demodulation, signal detection, decryption of payload (voice) and/or control data, and/or other analog and/or digital signal processing. Satellite telephone monitor 168 may further include signal/data analysis including voice recognition of one or more voices sent over the uplink and/or downlink, a serial number, telephone number, or other identifier from handset 150 and/or telephone connected to handset 150. Satellite telephone monitor 168 may further track location(s) of handset 150 over time and/or location of the connected telephone. Satellite telephone monitor 168 may include video graphical depicting the location(s) of the handset and/or connected phone.

Figure 2:
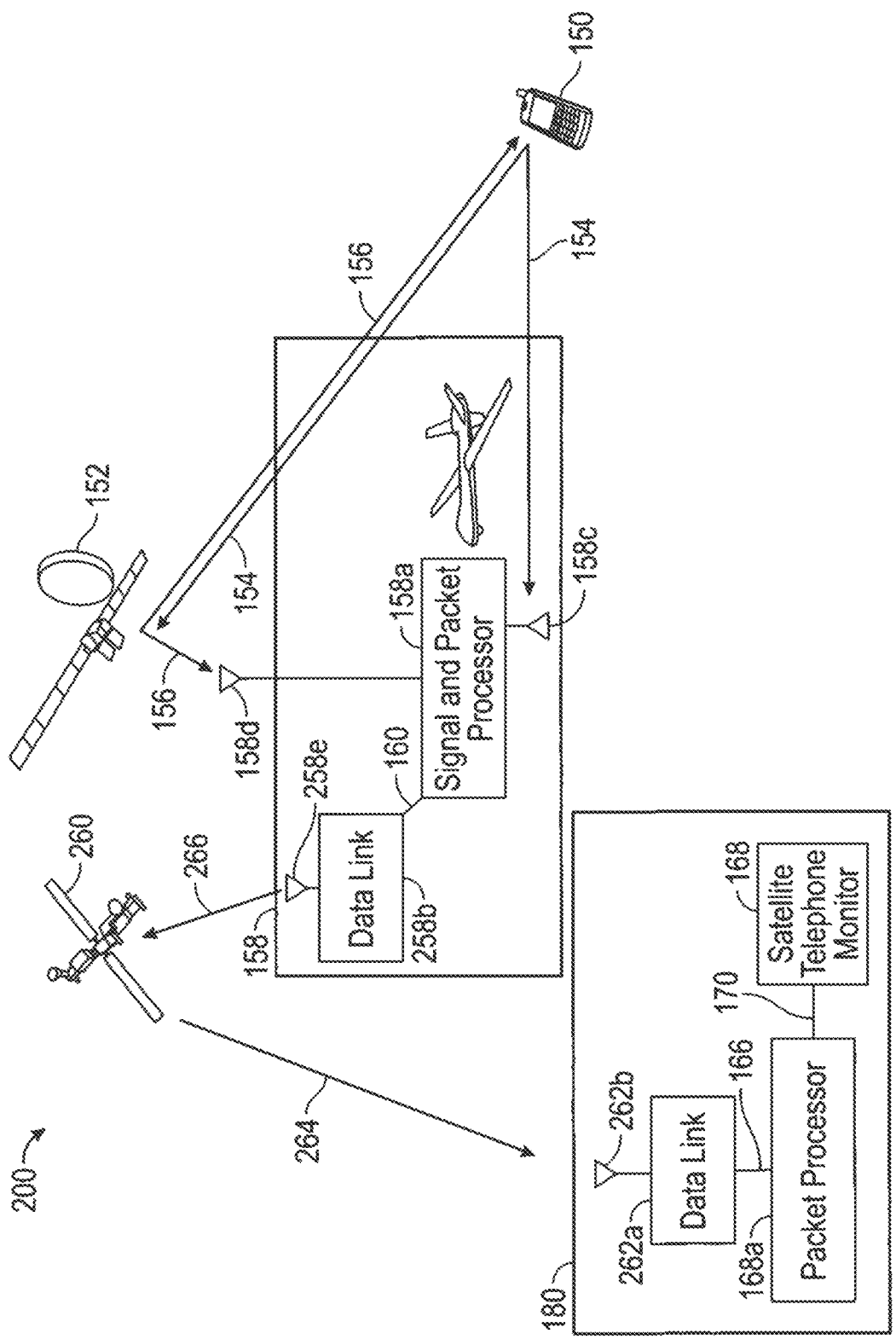
FIG. 2 depicts a UAV based satellite telephone monitoring system including a relay satellite, in accordance with some example embodiments.

FIG. 2 depicts another telephone monitoring system, in accordance with some example embodiments. The description of FIG. 2 also refers to FIG. 1. FIG. 2 depicts handset 150 in communication with satellite 152 to carry on a satellite telephone call. FIG. 2 further depicts UAV 158 that intercepts uplink 154 from handset 150 to satellite 152. UAV 158 may also intercept downlink 156 from satellite 152 to handset 150. UAV 158 may then uplink the intercepted handset communications via datalink 258b to satellite 260. Data link 260 may downlink the intercepted communications to ground station 180.

In embodiments consistent with FIG. 2, UAV 158 may transmit the intercepted handset uplink and downlink payload and control data to satellite 260, and satellite 260 may transmit the intercepted data to ground station 180. For example, UAV 158 may intercept uplink 154 from handset 150 and downlink 156 sent by satellite 152 to handset 150.

Signal and packet processor 158a as described above may generate a low data rate (for example, approximately 1-2 Mbps) data stream representative of the uplink 154 and downlink 156. Data link 258b may transmit the data stream via antenna 258e to satellite 260. Satellite 260 may receive the data stream from data link 258b and transmit the data stream to data link 262a included in or near ground station 180. In some example embodiments, data links 258b and 162a may operate at Ku-band, X-band, or any other frequency.

Signal and packet processor 158a may be connected to data link 258b and antennas 158c, 158d, and 258e. Signal and packet processor 158a may receive via antenna 158c the uplink from handset 150 (i.e., signal 154), and receive via antenna 158d the downlink from satellite 152 to handset 150. Signal and packet processor 158a may combine the received satellite telephone uplink and downlink into a single data stream. The combined data stream related to the call (signal 160) may be sent by data link 258b in signal 266 via antenna 258e to satellite 260. Satellite 260 may, in turn, may via signal 264 to ground station 180.

Ground station 180 may include data link 262a, antenna 262b, packet processor 168a, and satellite telephone monitor 168. Data link 262a may receive a data stream of satellite telephone combined uplink and downlink data via signal 264 received at antenna 262b from satellite 260.

In some embodiments, antennas 258e and 262b can transmit and receive RF data in Ku-band between 12 GHz and 18 GHz. Data link 262a may send digital data stream TCP/UDP packets (i.e., signal 166) to packet processor 168a included in satellite telephone monitoring system 180. Packet processor 168a may convert the call data stream TCP/UDP packets to radio frequency signals for processing by telephone monitoring system 168. For example, packet processor 168a may produce 1.5 GHz-1.6 GHz RF signals (i.e., signal 170) from data packets 166. The RF signals may be input into the satellite telephone monitoring system 168 for signal processing as further described below and in FIG. 5.

Figure 3:
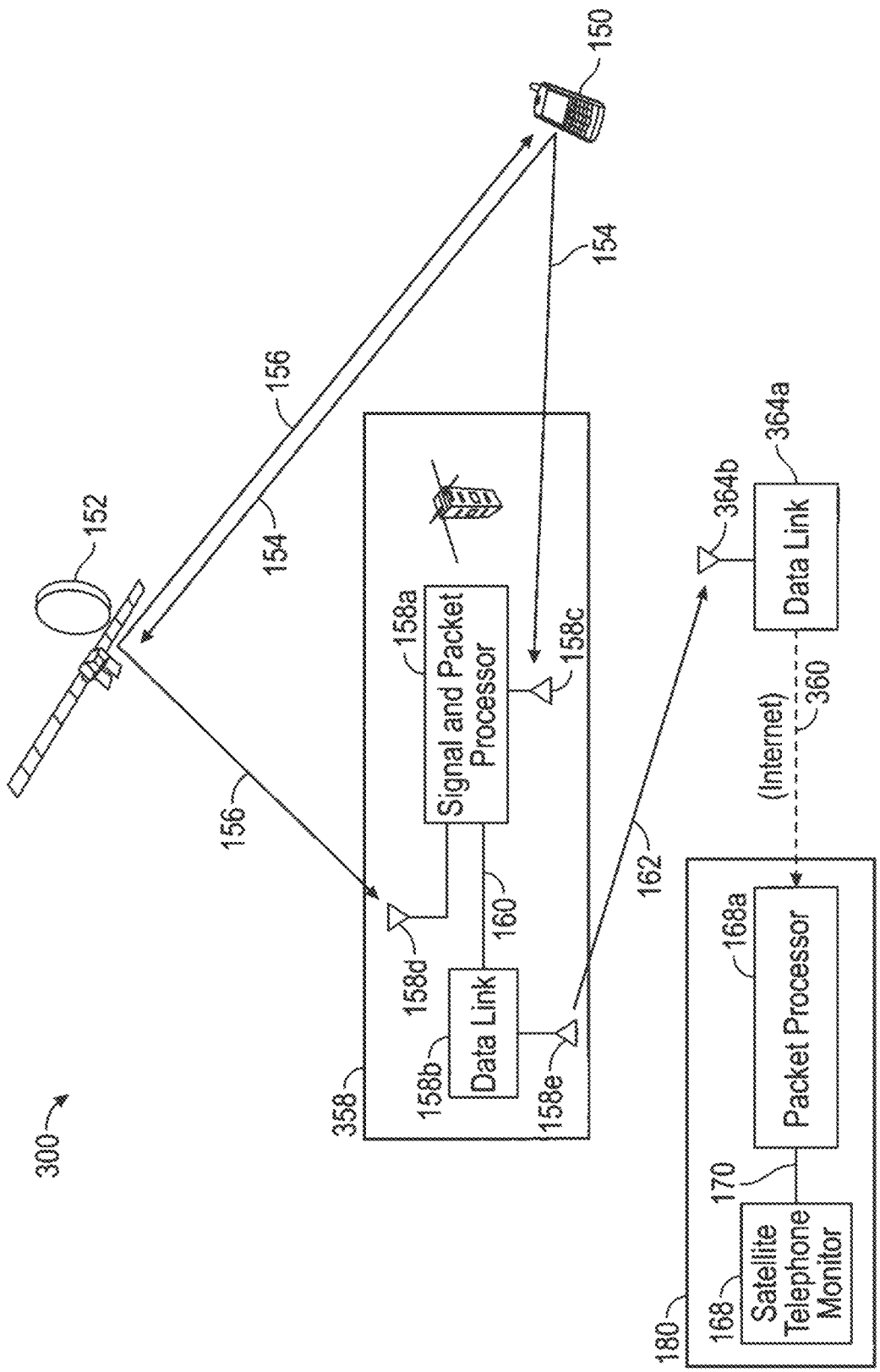
FIG. 3 depicts a CubeSat or small satellite based satellite telephone monitoring system, in accordance with some example embodiments.

FIG. 3 depicts another telephone monitoring system, in accordance with some example embodiments. The description of FIG. 3 also refers to FIGS. 1 and 2. FIG. 3 is similar to FIG. 1 except that UAV 158 is replaced by a satellite 358 including a low earth orbit (LEO) satellite such as a CubeSat, NanoSat, or other satellite (hereafter referred to as a CubeSat). CubeSat 358 may include signal and packet processor 158a, data link 158b, and antennas 158c, 158d, and 158e as described above. In the example of FIG. 3, data link 358b in CubeSat 358 communicates with data link 364a on the ground. Data link 364a may be located any distance from ground station 180. Data from data link 364a may be transferred to ground station 180 via the Internet 360.

Figure 4:
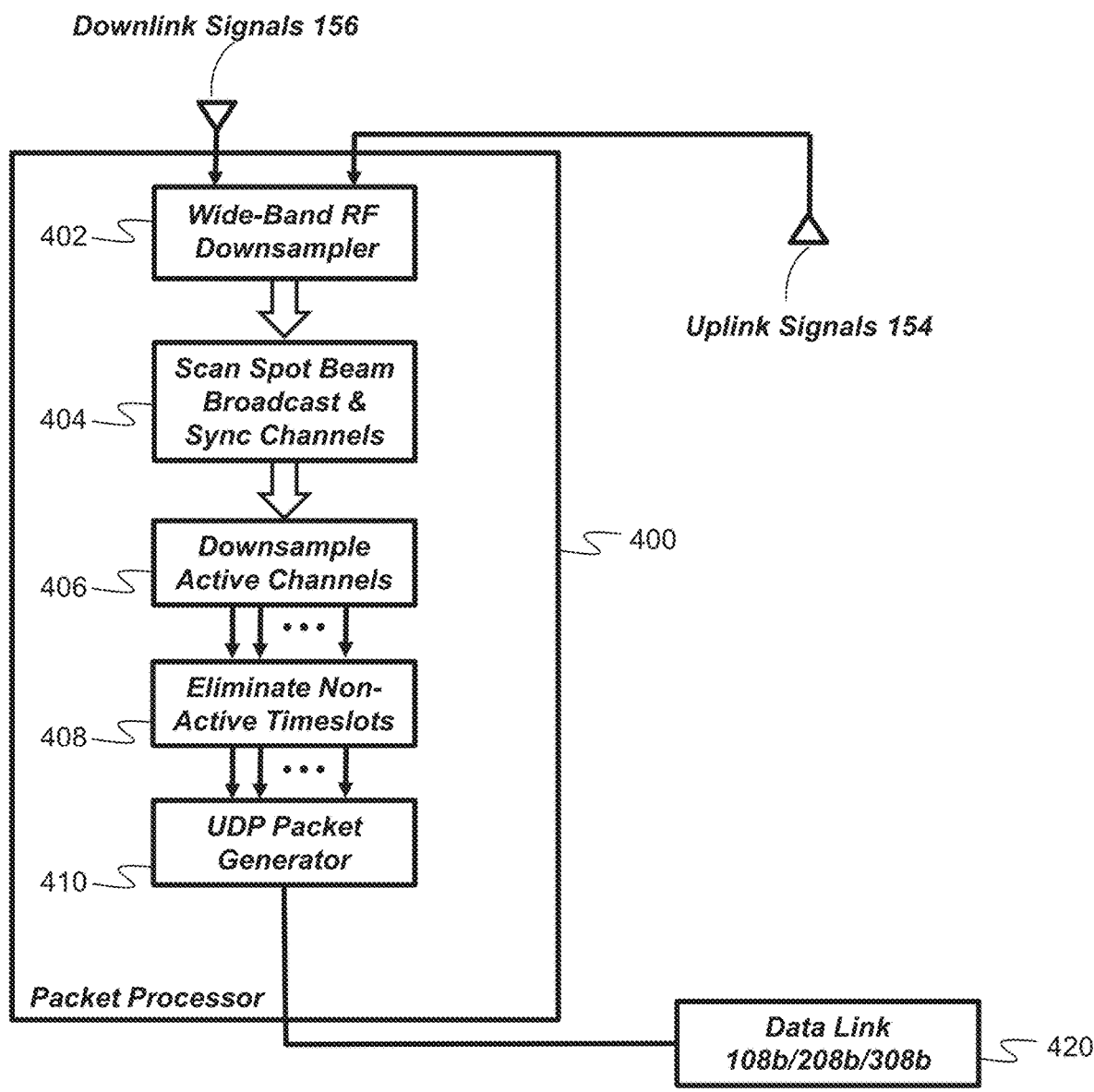
FIG. 4 depicts a signal and packet processor for a UAV or small satellite, in accordance with some example embodiments.

FIG. 4 depicts a process performed by signal and packet processor 158a, in accordance with some example embodiments. Signal and packet processor 158a may receive signals corresponding to uplink 154 and downlink 156.

At 402, a predetermined bandwidth may be sampled at the Nyquist rate or another predetermined sampling rate using, for example, an analog to digital converter. For example, a band approximately 34 MHz wide for each of the uplink and downlink may be digitized at 50 Megasamples per second (MSPS). In some example embodiments, a broadcast synchronization channel may also be digitized at 50 MSPS. In some example embodiments, the signal and packet processor may digitize the predetermined bandwidth at the predetermined sampling rate without performing demodulation or detection of the digitized signal. In other embodiments, signal and packet processor 158a may perform demodulation and detection of the digitized signal.

At 404, data from the synchronization channel may indicate used and available frequencies within the 34 MHz uplink and 34 MHz downlink. From the synchronization channel data, the frequency channels being used by one or more spot beams containing downlink signals may be determined. Each spot beam may have a 200 KHz bandwidth allocation. When up to three spot beams overlap, three bands of 200 KHz of bandwidth within the 34 MHz may contain satellite telephone payload and control data. Which 200 KHz band being used by handset 150 may be included in the synchronization information included in downlink 156. In some example embodiments, the uplink channel/frequency may be 101.5 MHz above the downlink channel/frequency. The uplink may be offset by a different frequency from 101.5 MHz and/or may be any frequency below the downlink channel/frequency.

At 406, the predetermined bandwidth (e.g., 34 MHz) for each of the uplink and downlink sampled at 50 MSPS may be downsampled to a lower sampling rate according to the 200 KHz channel(s) being used by the one or more spot beams for downlink 156 and being used by the handset 150 for uplink 154. For example, one spot beam may be used to send downlink 156. Accordingly, one 200 KHz channel may contain the downlink 156 payload and control information.

At 408, the downsampled data stream in 406 is further reduced according to the proportion of time for a TDMA timeslot. In this way, the inactive timeslots are eliminated as well as the corresponding data for the inactive timeslots. Eliminating the data from the inactive timeslots reduces the data link bandwidth and data rate needed to transmit the downlink signal via the data link such as data link 258b. In a similar way, the bandwidth and data rate needed to transmit the uplink payload and control data via data link 258b is reduced by eliminating inactive timeslots.

At 410, the downsampled and reduced data rate data streams for the uplink and downlink are prepared for transmission to a data link such as data link 158b. In some example embodiments, the reduced rate uplink and downlink streams are combined into a single serial data stream sent to data link 158b. In other embodiments, the combined data stream may be packetized according to any packetization protocol and sent to data link 158b.

Figure 5:
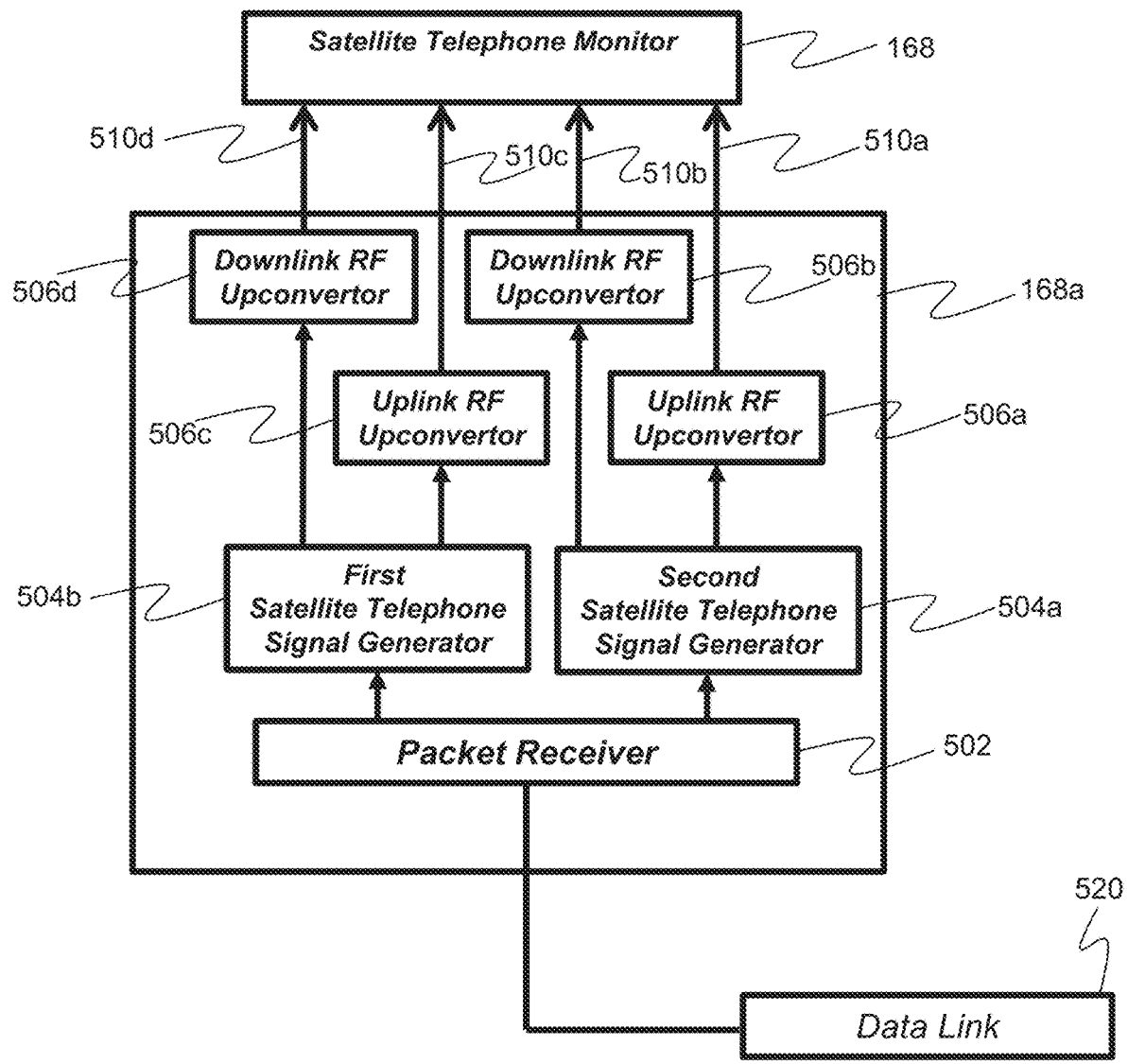
FIG. 5 depicts a packet processor for a ground station, in accordance with some example embodiments.

FIG. 5 depicts a ground station including data link 520, packet processor 168a, and satellite telephone monitor 168. The description of FIG. 5 also refers to FIGS. 1-4. Data link 520 may include any of the ground station data links described above. Satellite telephone monitor 168 is described above and in FIG. 6.

Packet processor 168a may receive the downsampled and reduced data rate signals corresponding to uplink 154 and downlink 156 received by data link 520 from UAV 158, CubeSat 358, or other vehicle. Packet processor 168a may detect any data errors in the received packets. Errors may be detected via an error detection code applied to the transmitted packets. When an error is detected, packet processor 168a may request that the packet be resent from UAV 158 or nanosat/CubeSat 358. In some example embodiments and error correction code may be used to correct errors in packets received at packet processor 168*a*. Packet receiver 502 in packet processor 168*a* may receive serial or packetized data from data link 520. Packet receiver 502 may separate the data according to which satellite telephone system the data corresponds and according to uplink and downlink data. Packet receiver 502 may send a first uplink data and first downlink data to a first satellite telephone signal generator 504*b*. Packet receiver 520 may send a second uplink data and second downlink data to a second satellite telephone signal generator 504*a*. Each satellite telephone signal generator 504*a* and 504*b* may generate baseband analog signals according to a satellite telephone system such as Thuraya or IsatPhone. For example, first satellite telephone generator 504*b* may generate signals corresponding to Thuraya and second satellite telephone generator 504*a* may generate satellite telephone signals corresponding to IsatPhone. The generated signals may correspond to the intercepted uplink 154 and downlink 156. Associated with satellite telephone generator 504*b* are uplink upconverter 510*c* and downlink upconverter 510*d* that upconvert to a higher frequency the satellite telephone signals from first satellite telephone signal generator 504*b*. Associated with satellite telephone generator 504*a* are uplink upconverter 510*a* and downlink upconverter 510*b* that upconvert to a higher frequency the satellite telephone signals from first satellite telephone signal generator 504*a*. For example, the downlink signals 510*b* and 510*d* may be upconverted to 1.5 GHz and the uplink signals 510*a* and 510*c* may be upconverted to 1.6 GHz. In another example, signals 510*a*-510*d* may be upconverted to one frequency such as 70 MHz. Satellite telephone monitor 168 may accept the upconverted signals.

Figure 6:
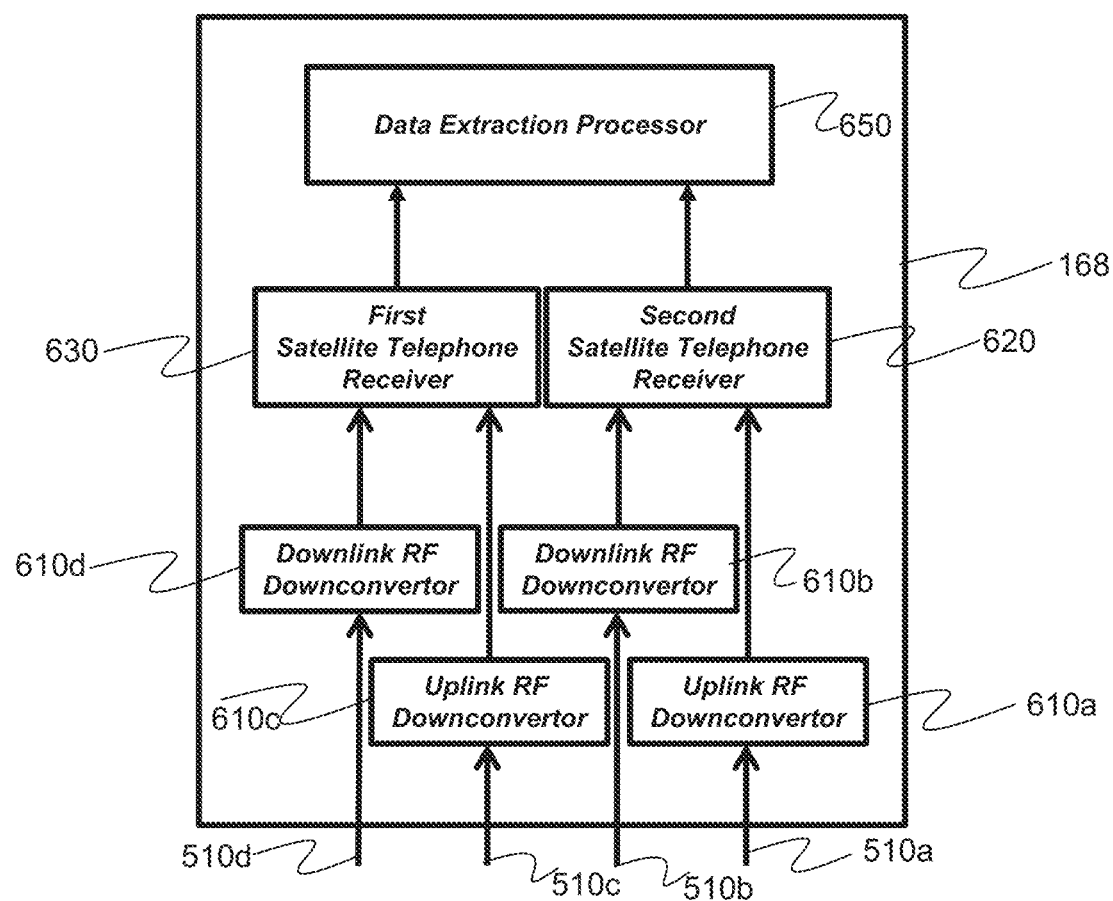
FIG. 6 depicts a satellite telephone monitor for a ground station, in accordance with some example embodiments.

FIG. 6 depicts a satellite telephone monitor 168, in accordance with some example embodiments. Satellite telephone monitor 168 may be included in ground station 180 and may accept signals 510*a*-510*d* from packet processor 168*a*. Signals 510*a*-510*d* may be downconverted by downconverters 610*a*-610*d*. The downconverted uplink from 610*c* and the downconverted downlink from 610*d* may be received by first satellite telephone receiver 630. The downconverted uplink from 610*a* and the downconverted downlink from 610*b* may be received by second satellite telephone receiver 620. In some example embodiments, uplink signals 510*a* and 510*c* may be at 1.6 GHz and downlink signals 510*b* and 510*d* may be at 1.5 GHz. In other embodiments, signals 510*a*-510*d* may be upconverted to one frequency such as 70 MHz. In some example embodiments, such as when 510*c* and 510*d* are at 70 MHz, downconverters 610*c* and 610*d* may be removed and 510*c* and 510*d* may connect to first satellite telephone receiver 630. Similarly, when 510*a* and 510*b* are at 70 MHz, downconverters 610*a* and 610*b* may be removed and 510*a* and 510*b* may connect to second satellite telephone receiver 620. The first and second satellite receivers 630 and 620 may provide payload and control data to data extraction processor 650. Data extraction processor 650 may provide demodulation and decryption of digital audio information contained in uplink and downlink payload data, and may decrypt other information as well. Data extraction processor may extract a serial number from satellite telephone 150 or identification information from the connected telephone connected to handset 150. For example, a connected telephone number, serial number, IMEI (International Mobile Equipment Identity), or other identifying information may be extracted from the connected telephone. The location of handset 150 may be tracked by data extraction processor 650 and presented in a graphical representation to a user of the satellite monitoring system. The data extraction processor may also provide forward error correction decoding or other signal processing on data from first and second satellite telephone receivers 630 and 620.

The disclosed and other embodiments and the functional operations and modules described in this document can be implemented in digital electronic circuitry including processors and memory and other digital and analog electronic components. For example, analog-to-digital converters, digital-to-analog converters, and/or other integrated circuits may be included. Radio frequency components including local oscillators, mixers, isolators, matching networks, and/or other radio frequency components may be included. Discrete components such as capacitors, resistors, inductors, transistors, and/or any other discrete or integrated electronic/electrical component may be included. Computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A system in an aerial vehicle for intercepting satellite telephone radio frequency (RF) signals being transmitted to a communications satellite, the system comprising:
   a first antenna on the aerial vehicle configured to receive signals at frequencies corresponding to an uplink from a mobile device being transmitted to a communications satellite, wherein the aerial vehicle comprises a cube satellite, unmanned aerial vehicle, or manned aerial vehicle;
   and
   a signal processing unit in the aerial vehicle configured to:
      receive, from the first antenna on a aerial vehicle, RF signals in a satellite frequency band from an uplink by a satellite telephone handset, being transmitted to a communications satellite;
      process RF signals in a satellite frequency band detected by the uplink antenna by digitizing the received signals, and packetizing data for transmission to a data link on the aerial vehicle;
   a data link on the aerial vehicle configured to receive, from the signal processing unit, processed signals corresponding to the detected uplink satellite telephone radio frequency signals to be received by a ground station for decoding.

2. The system for intercepting signals via an aerial vehicle according to claim 1, wherein the signal processing unit is further configured to detect a broadcast synchronization channel via a downlink antenna on the aerial vehicle.

3. The system for intercepting signals via an aerial vehicle according to claim 2, wherein the signal processing unit is further configured to: based upon channel data from the broadcast synchronization channel, determine one or more frequency channels in use by one or more handsets, wherein the frequency channels in use contain payload and control information to be transmitted via the data link on the aerial vehicle to a ground station.

4. The system for intercepting signals via an aerial vehicle according to claim 1, wherein the signal processor is configured to detect, via a downlink antenna for receiving RF signals in a satellite frequency band from an downlink by a communications satellite, a broadcast synchronization channel, from which the processor determines used and available frequencies within the uplink and downlink.

5. The system for intercepting signals via an aerial vehicle according to claim 1, wherein the signal processor is configured to use information in a broadcast synchronization channel determine which bands of 200 KHz contain satellite telephone payload and control data.

6. The system for intercepting signals via an aerial vehicle according to claim 1, wherein the signal processor is further configured to reduce a data stream of data from frequency channels in use by eliminating inactive timeslots.

7. The system for intercepting signals via an aerial vehicle according to claim 1, wherein the signal processor is further configured to combine an uplink and downlink data stream into a single data stream prior to packetizing the combined data stream to be sent to the data link on the aerial vehicle.

8. The system for intercepting signals via an aerial vehicle according to claim 1, wherein the data link is further configured to receive requests from a ground station to re-send data that had been transmitted via data errors.

9. A system for intercepting via an aerial vehicle satellite telephone radio frequency (RF) signals being transmitted to a communications satellite, comprising:
   an uplink antenna on the aerial vehicle configured to detect RF signals in a satellite frequency band from an uplink by a satellite telephone handset being transmitted to a communications satellite, wherein the aerial vehicle comprises a cube satellite, an unmanned aerial vehicle, or a manned aerial vehicle;
   a signal processor in the aerial vehicle configured to process RF signals in a satellite frequency band detected by the uplink antenna, by digitizing the received signals, and packetizing data for transmission to a data link on the aerial vehicle; and
   a data link on the cube satellite configured to transmit detected uplink satellite telephone radio frequency signals ultimately destined for a ground station for decoding.

10. The system for intercepting signals via an aerial vehicle according to claim 9, wherein a downlink antenna is further configured to detect a broadcast synchronization channel.

11. The system for intercepting signals via an aerial vehicle according to claim 10, wherein, based upon channel data from the broadcast synchronization channel, the signal processor is further configured to determine one or more frequency channels in use by one or more handsets, wherein the frequency channels in use contain payload and control information to be transmitted via the data link on the aerial vehicle to a ground station.

12. The system for intercepting via an aerial vehicle according to claim 9, wherein the signal processor is configured to detect, via a downlink antenna, a broadcast synchronization channel, from which the processor determines used and available frequencies within the uplink and downlink.

13. The system for intercepting via an aerial vehicle according to claim 9, wherein the signal processor is configured to use information in a broadcast synchronization channel determine which bands of 200 KHz contain satellite telephone payload and control data.

14. The system for intercepting via an aerial vehicle according to claim 9, wherein the signal processor is further configured to reduce a data stream of data from frequency channels in use by eliminating inactive timeslots.

15. The system for intercepting via an aerial vehicle according to claim 9, wherein the signal processor is further configured to combine an uplink and downlink data stream into a single data stream prior to packetizing the combined data stream to be sent to the data link on the aerial vehicle.

16. The system for intercepting via an aerial vehicle according to claim 9, wherein the data link is further configured to receive, via the data link on the aerial vehicle, requests from a ground station to re-send data that had been transmitted via data errors.

17. A system in a an aerial vehicle for intercepting satellite telephone radio frequency (RF) signals being transmitted from ground to a communications satellite, the system comprising:
    a first antenna on the configured to receive in the first frequency band an uplink from a mobile device being transmitted to a communications satellite,
    and
    a signal processing unit in the cube satellite, comprising:
        an analog to digital converter configured to sample RF signals;
        a first memory configured to store instructions, and a first processor configured to read instructions from the first memory and to implement a method for processing the uplink RF data, the instructions comprising:
    code for determining, from the sampled RF signals, RF information including frequency and timing information from a satellite spot beam;
    code for downsampling an uplink according to the RF information, to reduce a bandwidth of the uplink;
    code for compressing the call data stream by removing downsampled data corresponding to inactive frequencies and inactive timeslots of the downsampled uplink based on the determined frequency and timing information; and
    code for generating a call data packet stream based on the compressed call data stream, wherein the call data packet stream is representative of a satellite telephone call including an uplink from a satellite telephone handset to a satellite;
    a third antenna configured to transmit in a second frequency band the call data packet stream, wherein the transmission is ultimately destined for a ground station.

18. The system of claim 17, wherein the first frequency band is a L-Band.

19. The system of claim 17, wherein the second frequency band is a S-Band.

20. The system of claim 17, wherein the packet streams include one of TCP and UDP packets.

* * * * *